(12) United States Patent
Cormier

(10) Patent No.: US 7,111,425 B1  
(45) Date of Patent: Sep. 26, 2006

(54) ILLUMINABLE FISHING ROD

(76) Inventor: Eric P. Cormier, 24 Riverside Dr., Baltic, CT (US) 06330

( * ) Notice: Subject to any disclaimer, the term of this patent is extended or adjusted under 35 U.S.C. 154(b) by 0 days.

(21) Appl. No.: 11/093,987

(22) Filed: Mar. 31, 2005

(51) Int. Cl.
 A01K 87/00 (2006.01)
 A01K 97/02 (2006.01)
 A01K 85/00 (2006.01)

(52) U.S. Cl. ....................................... 43/17.5
(58) Field of Classification Search ................. 43/17.5
 See application file for complete search history.

(56) References Cited

U.S. PATENT DOCUMENTS

| | | | |
|---|---|---|---|
| 4,026,059 A | 5/1977 | Ochs | |
| 4,085,437 A * | 4/1978 | Hrdlicka et al. | 362/109 |
| 4,117,618 A * | 10/1978 | Utsler | 43/17.5 |
| 4,178,712 A * | 12/1979 | Williams | 43/17 |
| 4,369,486 A * | 1/1983 | Pool | 362/577 |
| 4,617,751 A * | 10/1986 | Johansson | 43/17.5 |
| 5,172,508 A | 12/1992 | Schmidt et al. | |
| 5,276,990 A | 1/1994 | Ramirez | |
| D349,748 S | 8/1994 | Lucero | |
| 5,347,741 A * | 9/1994 | Konrad | 43/17.5 |
| 5,406,735 A | 4/1995 | Howell | |
| D380,806 S | 7/1997 | Ostrander | |
| 5,738,433 A * | 4/1998 | Sparks | 362/109 |
| 5,826,366 A | 10/1998 | Matibe | |
| 5,913,671 A | 6/1999 | Fernandez et al. | |
| 6,405,475 B1 | 6/2002 | Wallace et al. | |
| 6,523,987 B1 * | 2/2003 | Lee | 362/577 |
| 6,546,665 B1 * | 4/2003 | Eldredge et al. | 43/17.5 |
| 6,594,942 B1 * | 7/2003 | Sherwood et al. | 43/17.5 |
| 2003/0019145 A1 | 1/2003 | Lybarger et al. | |
| 2004/0159039 A1 * | 8/2004 | Yates et al. | 43/17.5 |

* cited by examiner

*Primary Examiner*—Darren W. Ark  
*Assistant Examiner*—John Holman

(57) ABSTRACT

A fishing rod accessory includes a cylindrical coupling that has axially opposed end portions, a bore formed in fluid communication with the end portions, and a stop member positioned therein and extending along an interior surface of the coupling. A switch is partially nested within the coupling and has an axial bore formed therein. Such a switch further has proximal and distal end portions and a rectilinear finger protruding from the proximal end portion. A rectilinear axle has opposed end portions housed within the bore of the switch. A helical spring member is positioned about the axle and is resiliently deformable. The switch further includes a power supply source and an illuminable fixture electrically matable thereto. A fiber optic filament is positioned about the illuminable fixture. A fishing rod extension is removably positional about the switch. The fishing rod extension and the fishing rod intercalate the coupling and the switch therebeneath.

18 Claims, 4 Drawing Sheets

ILLUMINABLE FISHING ROD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fishing rods and, more particularly, to an illuminable fishing rod.

2. Prior Art

Fishing is an activity that draws avid enthusiasts, many of whom can not seem to be satisfied in limiting their enjoyment to daylight hours. Oftentimes, their expeditions will take them well past sunset, to the point of complete darkness. Unless the fisherman has a light source, such as a lantern or flashlight, further fishing would be almost futile. Besides not being able to string a line or bait a hook, one could not detect the subtle movement of the line or rod tip which provides important visual cues to the fisherman to be able to catch fish. Also, without a flashlight, a fisherman who stays past dusk may have trouble negotiating his return from the water in darkness.

To overcome the problem of rod visibility, a number of illuminated fishing poles have been known. The use of lighted fishing rod structures is known in the prior art. More specifically, lighted fishing rod structures heretofore devised and utilized are known to consist basically of familiar, expected and obvious structural configurations, notwithstanding the myriad of designs encompassed by the crowded prior art which have been developed for the fulfillment of countless objectives and requirements.

Some of these have included an exterior light source mounted on the rod or a light source in the handle illuminating the rod. These solutions have, however, been found lacking. The light sources mounted externally on the rods often interfere with casting and free line movement. The illumination sources within the handles often result in incomplete or inadequate illumination of the rod. In addition, with either of these solutions, a separate light source is still required for the general tasks within the boat, as noted above.

Furthermore, in order to obtain a lighted fishing rod, sports enthusiasts are required to purchase an entirely new rod, which can become quite expensive since most fisherman like to use more than one rod when fishing. Most attachable light sources are bulky and tend to interfere with the travel path of the fishing line.

Accordingly, a need remains for an illuminable fishing rod in order to overcome the above noted shortcomings. The present invention satisfies such a need by providing an illuminable fishing rod that is easy to use, adaptable to a variety of fishing rods, and can be used during low visibility conditions. In order to detect a striking fish, the fisherman must look at the tip of the fishing rod for subtle movements indicating the presence of a fish. This task is difficult enough as it is, but becomes virtually impossible during the dusk and dawn hours of the day, which consequently are optimal feeding times for many fish species. The illuminable fishing rod conveniently allows a fisherman to detect a strike before a fish releases the bait or breaks the line during poor lighting conditions. Such an illuminable fishing rod further eliminates the need to carry around other bulky light sources, like lanterns and flashlights, that also tend to attract mosquitoes and other biting insects when used.

BRIEF SUMMARY OF THE INVENTION

In view of the foregoing background, it is therefore an object of the present invention to provide an illuminable fishing rod. These and other objects, features, and advantages of the invention are provided by a battery-operated and illuminable fishing rod accessory removably attachable to an existing fishing rod.

The fishing rod accessory includes a coupling that has a cylindrical shape provided with a centrally disposed longitudinal axis registered parallel with a longitudinal length of the fishing rod. Such a coupling has axially opposed proximal and distal end portions and further has a bore formed in fluid communication with the proximal and distal end portions respectively. The coupling is sized and shaped for securely conjoining to an end portion of the fishing rod distally positioned from at least one annular guide ring of the fishing rod. Such a coupling also includes a stop member diametrically positioned therein and extending along an interior surface of the coupling for advantageously preventing objects from moving proximally beyond the proximal end portion of the coupling. The stop member is preferably situated proximate to the distal end portion of the coupling and to an exterior of the fishing rod.

A switch that has a cylindrical shape is partially nested within a portion of the coupling. Such a switch has an axial bore formed therein and is provided with a centrally disposed longitudinal axis registered with the longitudinal axis of the coupling. The longitudinal length of the switch is shorter than the longitudinal length of the coupling. Such a switch maintains a fixed spatial relationship with the coupling during operating conditions and is conveniently removable from the coupling during non-operating conditions. The switch further has proximal and distal end portions. The proximal end portion of the switch may be housed within the coupling and the distal end portion of the switch is preferably disposed to an exterior of the coupling.

Such a switch also includes a rectilinear finger protruding rearwardly from the proximal end portion of the switch and extending away from the fiber optic filament. The finger portion is preferably axially conjoined to the proximal end portion of the switch. A rectilinear axle has opposed end portions housed within the bore of the switch and is axially registered with the finger. A helical spring member is positioned about the axle and is resiliently deformable when the switch is intercalated and abutted against the stop member of the coupling. Such a spring member may be axially compressible along a linear path aligned with the longitudinal axis of the coupling. The switch further includes a power supply source and an illuminable fixture distally extending away from the power supply source and electrically matable thereto. The power supply source becomes actuated when the finger engages the stop member of the coupling and compresses the helical member to electrically mate the illuminable fixture with the power supply source.

A hollow and rectilinear fiber optic filament is positioned about the illuminable fixture for effectively and advantageously directing light distally along a length of the fishing rod accessory. Such a fiber optic filament preferably has a longitudinal axis aligned with the longitudinal axis of the coupling. The fiber optic filament axially extends from the illuminable fixture to a distal end portion of the fishing rod extension.

A fishing rod extension is removably positional about the switch in such a manner that a proximal end portion of the fishing rod abuts and maintains continuous contact with the fishing rod. Such a fishing rod extension and the fishing rod intercalate the coupling and the switch therebeneath so that the coupling and the switch conveniently become invisible from an exterior of the fishing rod during operating conditions.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
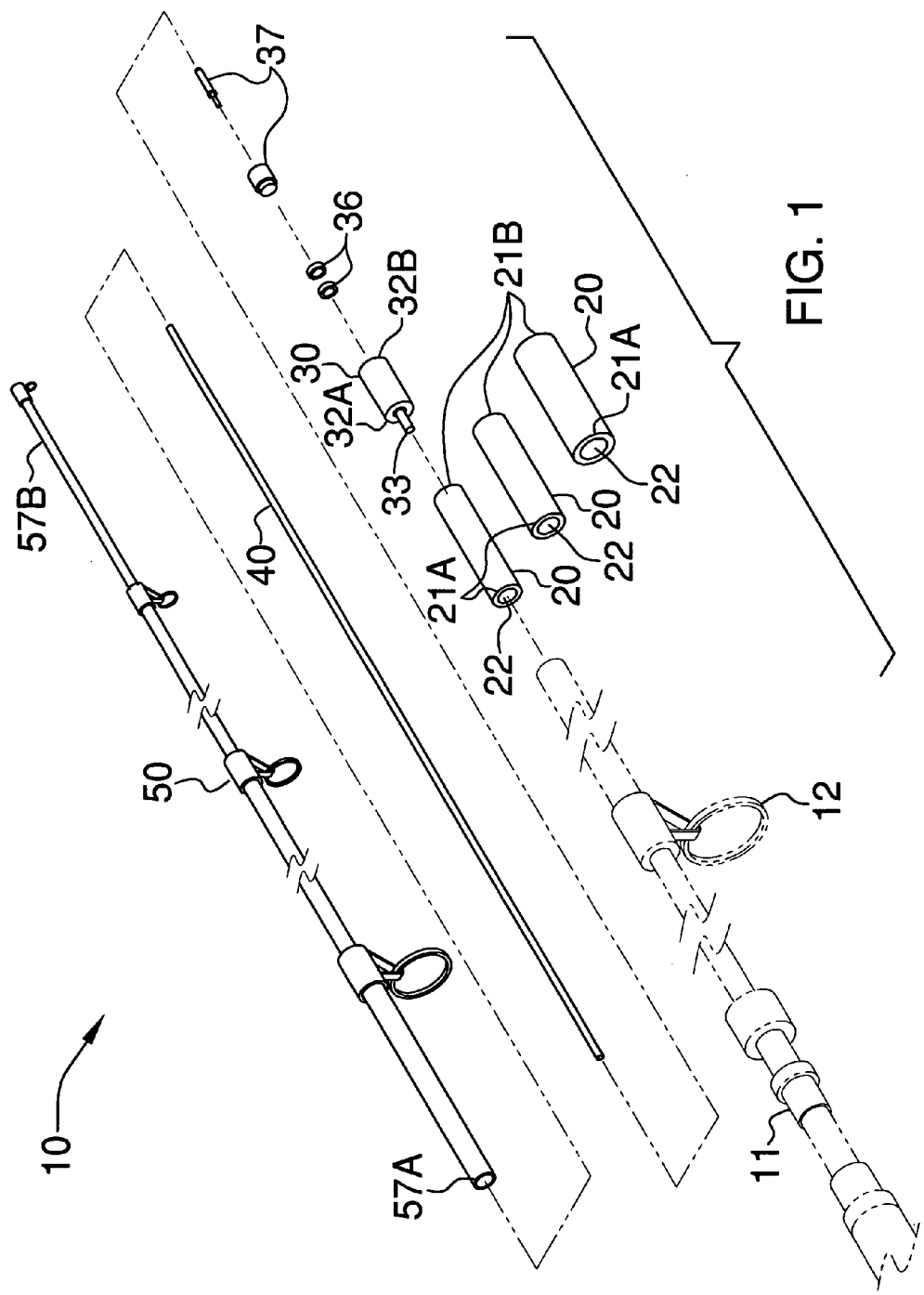
FIG. 1 is an exploded perspective view showing an illuminable fishing rod, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–4 by the reference numeral 10 and is intended to provide an illuminable fishing rod. It should be understood that the assembly 10 may be used to illuminate many different types of fishing rods and should not be limited in use to only freshwater fishing rods.

Referring initially to FIG. 1, the assembly 10 includes a coupling 20 that has a cylindrical shape provided with a centrally disposed longitudinal axis registered parallel with a longitudinal length of the fishing rod 11. Such a coupling 20 has axially opposed proximal 21A and distal 21B end portions and further has a bore 22 formed in fluid communication with the proximal 21A and distal 21B end portions respectively. The coupling 20 is sized and shaped for securely conjoining to an end portion of the fishing rod 11 distally positioned from at least one annular guide ring 12 of the fishing rod 11. Of course, the coupling 20 may be produced in a variety of different sizes and diameters so as to accommodate various fishing rods, as is obvious to a person of ordinary skill in the art. Such a coupling 20 also includes a stop member 23 diametrically positioned therein and extending along an interior surface of the coupling 20. Such a stop member 23 is essential and advantageous for preventing objects from moving proximally beyond the proximal end portion 21A of the coupling 20. The stop member 23 is situated proximate to the distal end portion 21B of the coupling 20 and to an exterior of the fishing rod 11.

Figure 3:
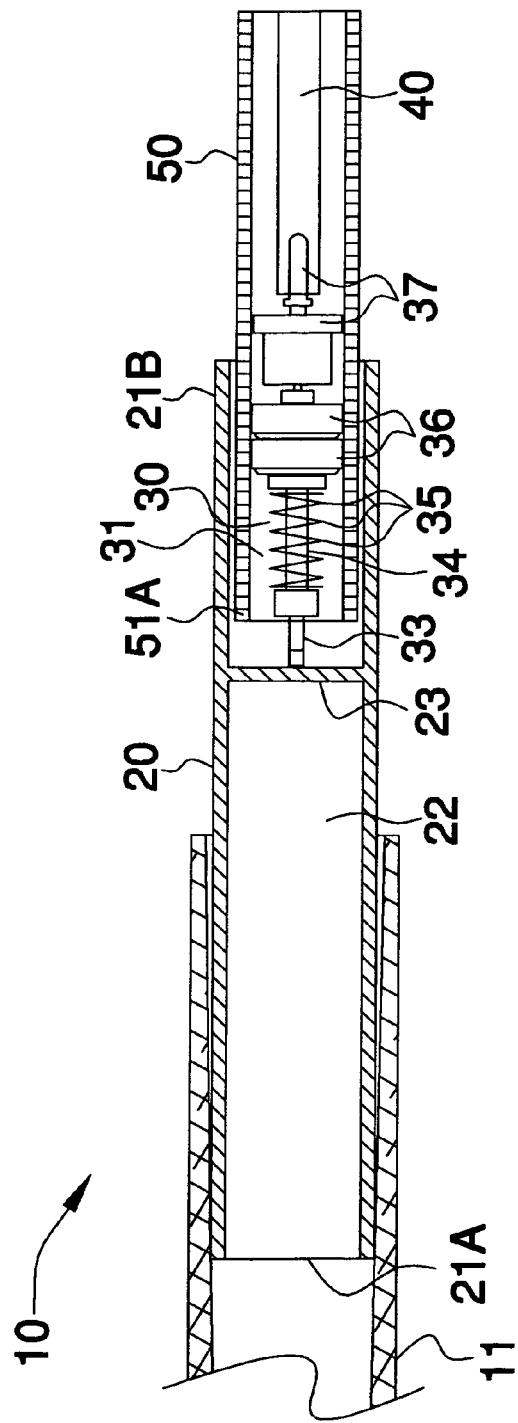
FIG. 3 is a cross-sectional view of the assembly shown in FIG. 2, taken along line 3—3.

Referring to FIGS. 1 and 3, a switch 30 that has a cylindrical shape, is partially nested within a portion of the coupling 20. Such a switch 30 has an axial bore 31 formed therein and is provided with a centrally disposed longitudinal axis registered with the longitudinal axis of the coupling 20. The longitudinal length of the switch 30 is shorter than the longitudinal length of the coupling 20. Such a switch 30 maintains a fixed spatial relationship with the coupling 20 during operating conditions and is conveniently removable from the coupling 20 during non-operating conditions, so that unnecessary lighting is not provided. The switch 30 further has proximal 32A and distal 32B end portions. The proximal end portion 32A of the switch 30 is housed within the coupling 20 and the distal end portion 32B of the switch 30 is disposed to an exterior of the coupling 20.

Figure 4:
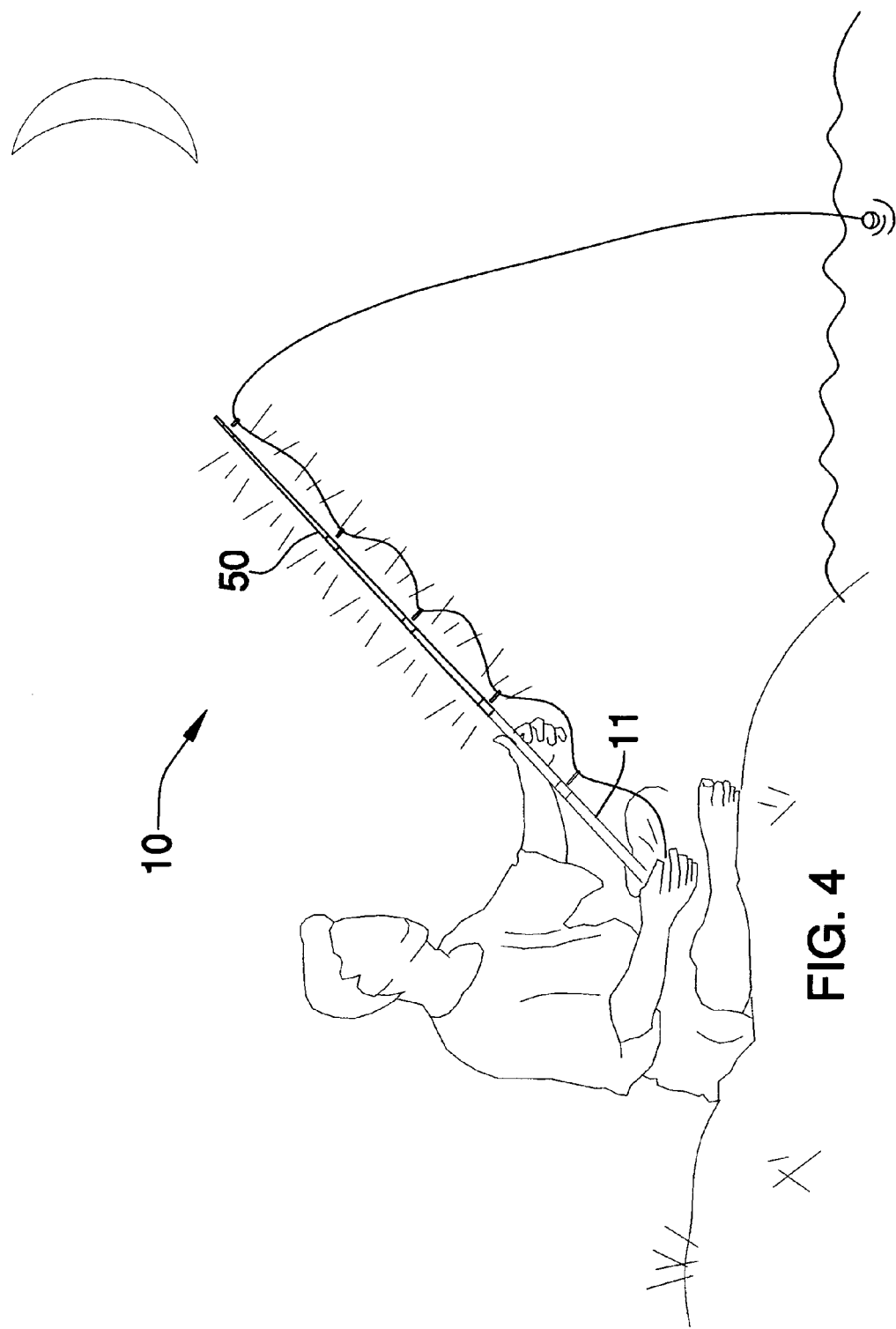
FIG. 4 is a side-elevational view showing the assembly shown in FIG. 2, during operating conditions.

Still referring to FIGS. 1, 3 and 4, such a switch 30 also includes a rectilinear finger 33 protruding rearwardly from the proximal end portion 32A of the switch 30 and extending away from the fiber optic filament 40 (described herein below). The finger portion 33 is axially conjoined to the proximal end portion 32A of the switch 30 and is vital for allowing the switch 30 to be activated during operating conditions. A rectilinear axle 34 has opposed end portions housed within the bore 31 of the switch 30 and is axially registered with the finger 33. A helical spring member 35 is positioned about the axle 34 and is resiliently deformable when the switch 30 is intercalated and abutted against the stop member 23 of the coupling 20. Such a spring member 35 is axially compressible along a linear path aligned with the longitudinal axis of the coupling 20.

The switch 30 further includes a power supply source 36 and an illuminable fixture 37 distally extending away from the power supply source 36 and electrically matable thereto. Such an illuminable fixture 37 may include, but is not limited to, a small incandescent bulb or a Light Emitting Diode (LED), as is obvious to a person of ordinary skill in the art. The power supply source 36 becomes actuated when the finger 33 engages the stop member 23 of the coupling 20 and compresses the helical spring member 35 to electrically mate the illuminable fixture 37 with the power supply source 36, as best illustrated in FIG. 4.

Figure 2:
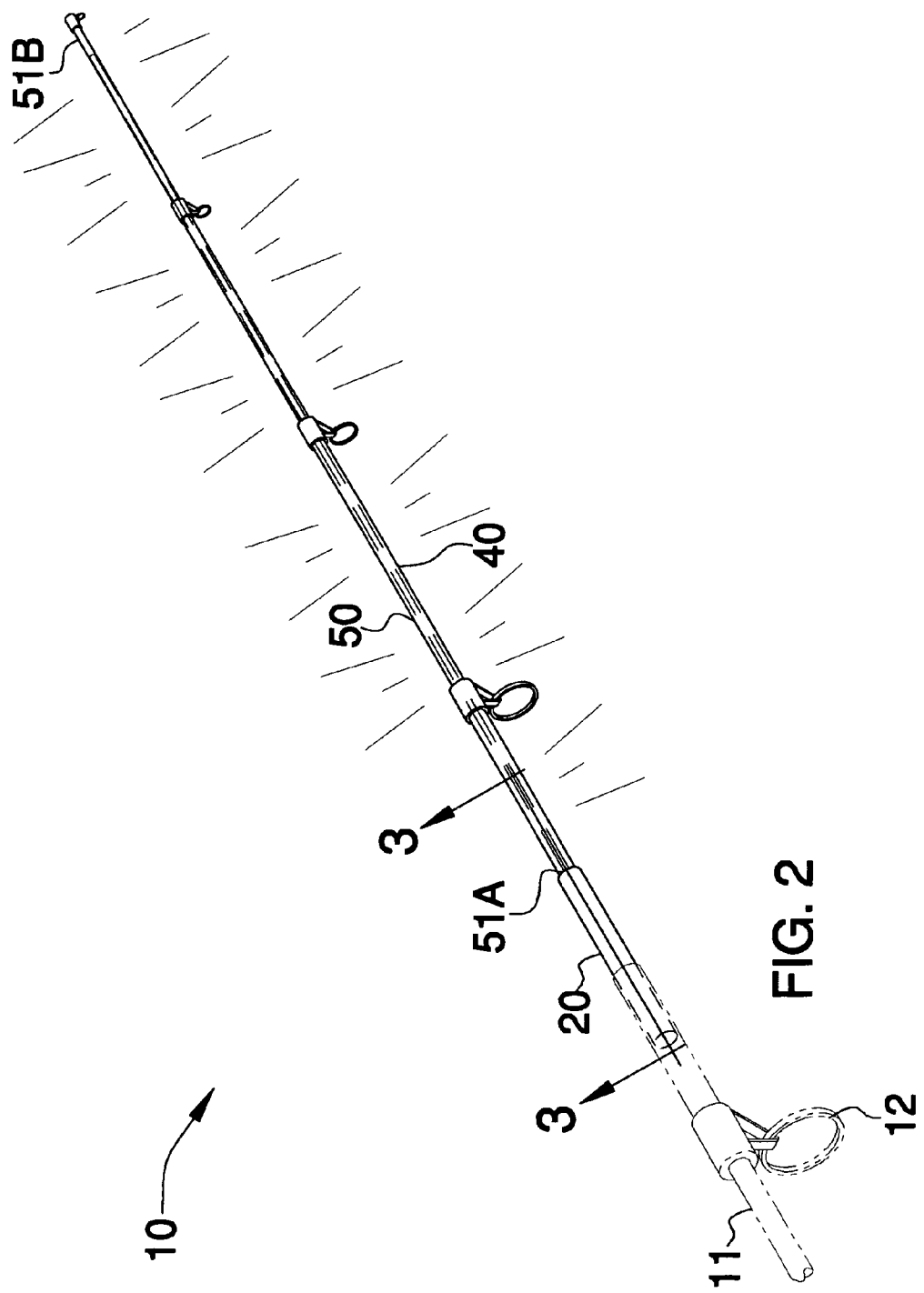
FIG. 2 is a perspective view of the assembly shown in FIG. 1.

Referring to FIGS. 1 through 3, a hollow and rectilinear fiber optic filament 40 is positioned about the illuminable fixture 37 for effectively and advantageously directing light distally along a length of the fishing rod accessory 10. Such a fiber optic filament 40 has a longitudinal axis aligned with the longitudinal axis of the coupling 20. The fiber optic filament 40 axially extends from the illuminable fixture 37 to a distal end portion 51B of the fishing rod extension 50 (described herein below) and is vital to the proper operation of the assembly 10.

Referring to FIGS. 1 through 4, a transparent fishing rod extension 50 is removably positional about the switch 30 in such a manner that a proximal end portion 51A of the fishing rod extension 50 abuts and maintains continuous contact with the fishing rod 11. Of course, the fishing rod extension 50 may be produced in a variety of different widths and sizes for various fishing applications, as is obvious to a person of ordinary skill in the art. Such a fishing rod extension 50 and the fishing rod 11 intercalate the coupling 20 and the switch 30 therebeneath so that the coupling 20 and the switch 30 conveniently become invisible from an exterior of the fishing rod 11 during operating conditions, thus advantageously maintaining the aesthetic appearance thereof.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A battery-operated and illuminable fishing rod accessory in combination with a fishing rod, said fishing rod accessory comprising:
    a coupling having a cylindrical shape provided with a centrally disposed longitudinal axis registered parallel with a longitudinal length of the fishing rod, said coupling having axially opposed proximal and distal end portions and further having a bore formed in fluid communication with said proximal and distal end portions respectively, said coupling being sized and shaped for securely conjoining to an end portion of said fishing rod distally positioned from at least one annular guide ring of the fishing rod, said coupling including a stop member diametrically positioned therein and extending along an interior surface of said coupling for preventing objects from moving proximally beyond said proximal end portion of said coupling;
    a switch having a cylindrical shape partially nested within a portion of said coupling, said switch further having an axial bore formed therein and provided with a centrally disposed longitudinal axis registered with the longitudinal axis of said coupling, said switch maintaining a fixed spatial relationship with said coupling during operating conditions and being removable from said coupling during non-operating conditions, said switch further having proximal and distal end portions, said switch comprising
        a rectilinear finger protruding rearwardly from said proximal end portion of said switch,
        a rectilinear axle having opposed end portions housed within the bore of said switch and axially registered with said finger,
        a helical spring member positioned about said axle and being resiliently deformable when said switch is intercalate and abutted against said stop member of said coupling,
        a power supply source; and
        an illuminable fixture distally extending away from said power supply source and electrically matable thereto;
    wherein said power supply source becomes actuated when said finger engages said stop member of said coupling and compresses said helical member to electrically mate said illuminable fixture with said power supply source;
    a hollow and rectilinear fiber optic filament positioned about said illuminable fixture for directing light distally along a length of said fishing rod accessory; and
    a fishing rod extension removably positional about said switch in such a manner that a proximal end portion of said fishing rod abuts and maintains continuous contact with said fishing rod, said fishing rod extension and said fishing rod intercalating said coupling and said switch therebeneath so that said coupling and said switch becomes invisible from an exterior of the fishing rod during operating conditions.

2. The fishing rod accessory of claim 1, wherein said finger portion is axially conjoined to said proximal end portion of said switch.

3. The fishing rod accessory of claim 1, wherein said fiber optic filament has a longitudinal axis aligned with the longitudinal axis of said coupling, said fiber optic filament axially extending from said illuminable fixture to a distal end portion of said fishing rod extension.

4. The fishing rod accessory of claim 1, wherein said spring member is axially compressible along a linear path aligned with the longitudinal axis of said coupling.

5. The fishing rod accessory of claim 1, wherein said stop member is situated proximate said distal end portion of said coupling and exterior of the fishing rod.

6. The fishing rod accessory of claim 1, wherein said proximal end portion of said switch is housed within said coupling and said distal end portion of said switch is disposed exterior of said coupling.

7. A battery-operated and illuminable fishing rod accessory in combination with a fishing rod, said fishing rod accessory comprising:
    a coupling having a cylindrical shape provided with a centrally disposed longitudinal axis registered parallel with a longitudinal length of the fishing rod, said coupling having axially opposed proximal and distal end portions and further having a bore formed in fluid communication with said proximal and distal end portions respectively, said coupling being sized and shaped for securely conjoining to an end portion of said fishing rod distally positioned from at least one annular guide ring of the fishing rod, said coupling including a stop member diametrically positioned therein and extending along an interior surface of said coupling for preventing objects from moving proximally beyond said proximal end portion of said coupling;
    a switch having a cylindrical shape partially nested within a portion of said coupling, said switch further having an axial bore formed therein and provided with a centrally disposed longitudinal axis registered with the longitudinal axis of said coupling, said switch maintaining a fixed spatial relationship with said coupling during operating conditions and being removable from said coupling during non-operating conditions, said switch further having proximal and distal end portions, said switch comprising
    a rectilinear finger protruding rearwardly from said proximal end portion of said switch,
    a rectilinear axle having opposed end portions housed within the bore of said switch and axially registered with said finger,
    a helical spring member positioned about said axle and being resiliently deformable when said switch is intercalate and abutted against said stop member of said coupling,
    a power supply source; and
    an illuminable fixture distally extending away from said power supply source and electrically matable thereto;
wherein the longitudinal length of said switch is shorter than the longitudinal length of said coupling;
wherein said power supply source becomes actuated when said finger engages said stop member of said coupling and compresses said helical member to electrically mate said illuminable fixture with said power supply source;
a hollow and rectilinear fiber optic filament positioned about said illuminable fixture for directing light distally along a length of said fishing rod accessory; and
a fishing rod extension removably positional about said switch in such a manner that a proximal end portion of said fishing rod abuts and maintains continuous contact with said fishing rod, said fishing rod extension and said fishing rod intercalating said coupling and said switch therebeneath so that said coupling and said switch becomes invisible from an exterior of the fishing rod during operating conditions.

8. The fishing rod accessory of claim 7, wherein said finger portion is axially conjoined to said proximal end portion of said switch.

9. The fishing rod accessory of claim 7, wherein said fiber optic filament has a longitudinal axis aligned with the longitudinal axis of said coupling, said fiber optic filament axially extending from said illuminable fixture to a distal end portion of said fishing rod extension.

10. The fishing rod accessory of claim 7, wherein said spring member is axially compressible along a linear path aligned with the longitudinal axis of said coupling.

11. The fishing rod accessory of claim 7, wherein said stop member is situated proximate said distal end portion of said coupling and exterior of the fishing rod.

12. The fishing rod accessory of claim 7, wherein said proximal end portion of said switch is housed within said coupling and said distal end portion of said switch is disposed exterior of said coupling.

13. A battery-operated and illuminable fishing rod accessory in combination with a fishing rod, said fishing rod accessory comprising:
    a coupling having a cylindrical shape provided with a centrally disposed longitudinal axis registered parallel with a longitudinal length of the fishing rod, said coupling having axially opposed proximal and distal end portions and further having a bore formed in fluid communication with said proximal and distal end portions respectively, said coupling being sized and shaped for securely conjoining to an end portion of said fishing rod distally positioned from at least one annular guide ring of the fishing rod, said coupling including a stop member diametrically positioned therein and extending along an interior surface of said coupling for preventing objects from moving proximally beyond said proximal end portion of said coupling;
    a switch having a cylindrical shape partially nested within a portion of said coupling, said switch further having an axial bore formed therein and provided with a centrally disposed longitudinal axis registered with the longitudinal axis of said coupling, said switch maintaining a fixed spatial relationship with said coupling during operating conditions and being removable from said coupling during non-operating conditions, said switch further having proximal and distal end portions, said switch comprising
        a rectilinear finger protruding rearwardly from said proximal end portion of said switch,
        a rectilinear axle having opposed end portions housed within the bore of said switch and axially registered with said finger,
        a helical spring member positioned about said axle and being resiliently deformable when said switch is intercalate and abutted against said stop member of said coupling,
        a power supply source; and
        an illuminable fixture distally extending away from said power supply source and electrically matable thereto;
    wherein the longitudinal length of said switch is shorter than the longitudinal length of said coupling;
    wherein said finger axially extends away from said fiber optic filament;
    wherein said power supply source becomes actuated when said finger engages said stop member of said coupling and compresses said helical member to electrically mate said illuminable fixture with said power supply source;
    a hollow and rectilinear fiber optic filament positioned about said illuminable fixture for directing light distally along a length of said fishing rod accessory; and
    a fishing rod extension removably positional about said switch in such a manner that a proximal end portion of said fishing rod abuts and maintains continuous contact with said fishing rod, said fishing rod extension and said fishing rod intercalating said coupling and said switch therebeneath so that said coupling and said switch becomes invisible from an exterior of the fishing rod during operating conditions.

14. The fishing rod accessory of claim 13, wherein said finger portion is axially conjoined to said proximal end portion of said switch.

15. The fishing rod accessory of claim 13, wherein said fiber optic filament has a longitudinal axis aligned with the longitudinal axis of said coupling, said fiber optic filament axially extending from said illuminable fixture to a distal end portion of said fishing rod extension.

16. The fishing rod accessory of claim 13, wherein said spring member is axially compressible along a linear path aligned with the longitudinal axis of said coupling.

17. The fishing rod accessory of claim 13, wherein said stop member is situated proximate said distal end portion of said coupling and exterior of the fishing rod.

18. The fishing rod accessory of claim 13, wherein said proximal end portion of said switch is housed within said coupling and said distal end portion of said switch is disposed exterior of said coupling.

* * * * *